Figure 1:
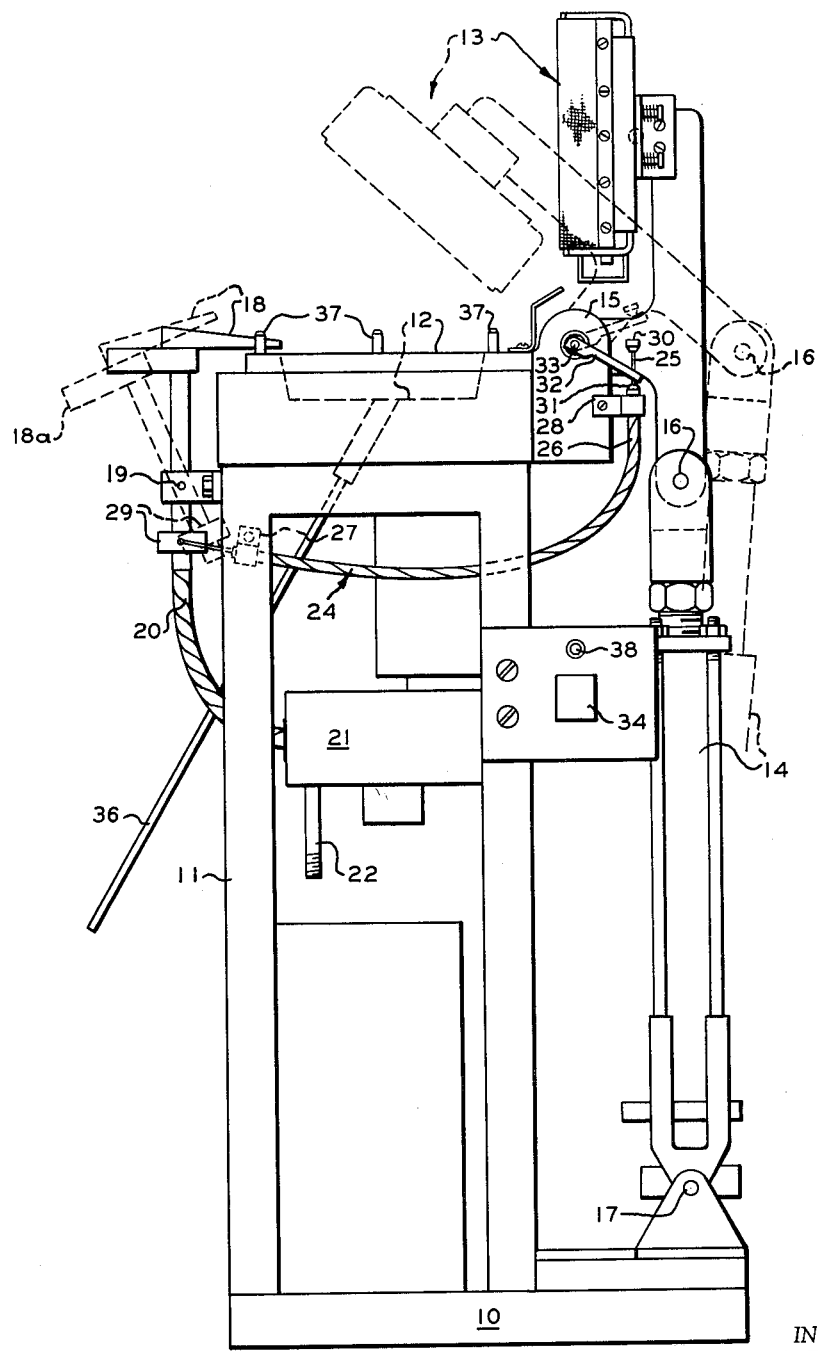

Sept. 21, 1965            L. F. HANES            3,206,909

HEAT SEALING THERMOPLASTIC PACKAGES

Filed March 23, 1961            3 Sheets-Sheet 1

INVENTOR.
L.F. HANES

BY

ATTORNEYS

Sept. 21, 1965 L. F. HANES 3,206,909
HEAT SEALING THERMOPLASTIC PACKAGES
Filed March 23, 1961 3 Sheets-Sheet 2

INVENTOR.
L.F. HANES
BY
ATTORNEYS

Sept. 21, 1965 L. F. HANES 3,206,909
HEAT SEALING THERMOPLASTIC PACKAGES
Filed March 23, 1961 3 Sheets-Sheet 3

INVENTOR.
L. F. HANES
BY Hudson & Young
ATTORNEYS

United States Patent Office 3,206,909
Patented Sept. 21, 1965

3,206,909
HEAT SEALING THERMOPLASTIC PACKAGES
Lewis F. Hanes, Bartlesville, Okla., assignor to Phillips Petroleum Company, a corporation of Delaware
Filed Mar. 23, 1961, Ser. No. 97,788
15 Claims. (Cl. 53—39)

This invention relates to heat sealing of thermoplastic units. In one aspect the invention relates to a method for sealing thermoplastic units which includes interposing a flexible member between a heat source and the unit to be sealed, the member being spaced from the source and the unit. In another aspect this invention relates to a heat sealing machine comprising a heated sealing element and a flexible member interposed and spaced between this element and the element to be sealed. In another aspect this invention relates to a heat sealing element comprising a heated face and a flexible member attached to said element but spaced from the face thereof.

Thermoplastic film and sheet materials are very useful for packaging many types of commodities, one well known example food products, and for the fabrication of other useful structures. One of the advantages of the use of thermoplastic materials is that heat sealing can be used to fabricate and seal packages such as bags, boxes, wrapped coatings, etc. and to complete the construction of other items. One method for heating sealing plastic structures comprises contacting the material to be sealed with a heated sealing element. This method sometimes occasions difficulty due to adherence of the thermoplastic material to the heating sealing element.

When the unit being sealed is a plastic container it is desirable, in some instances, to purge the container prior to filling or prior to final completion of filling to eliminate oxygen and to kill bacteria. This is especially important when a thermoplastic container is being used for food packaging.

It is an object of this invention to prevent adherence of a heat sealing element and a thermoplastic unit being sealed. Another object of this invention is to provide rapid and effective package purging and sealing.

Other aspects, objects and the several advantages of this invention are apparent upon study of this application, the drawing and the appended claims.

Figure 2:
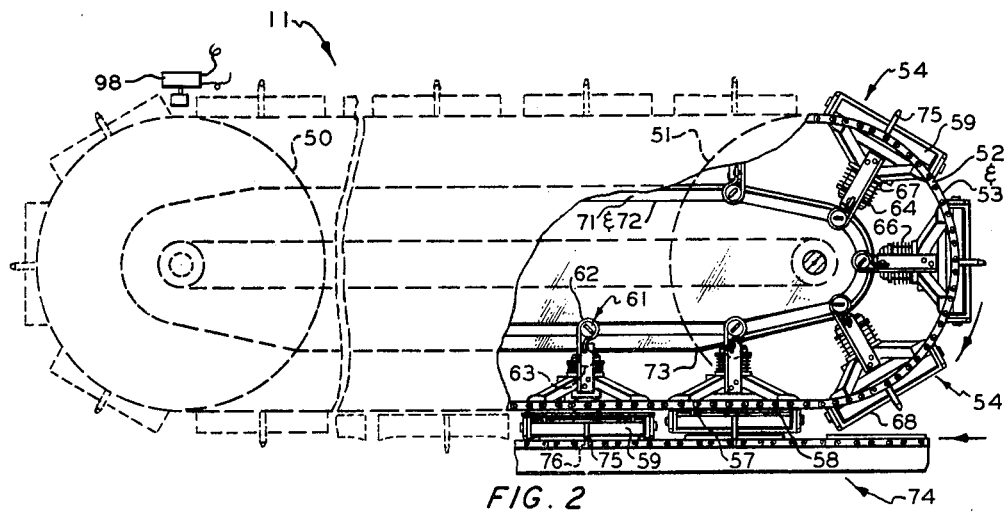
Figure 4:
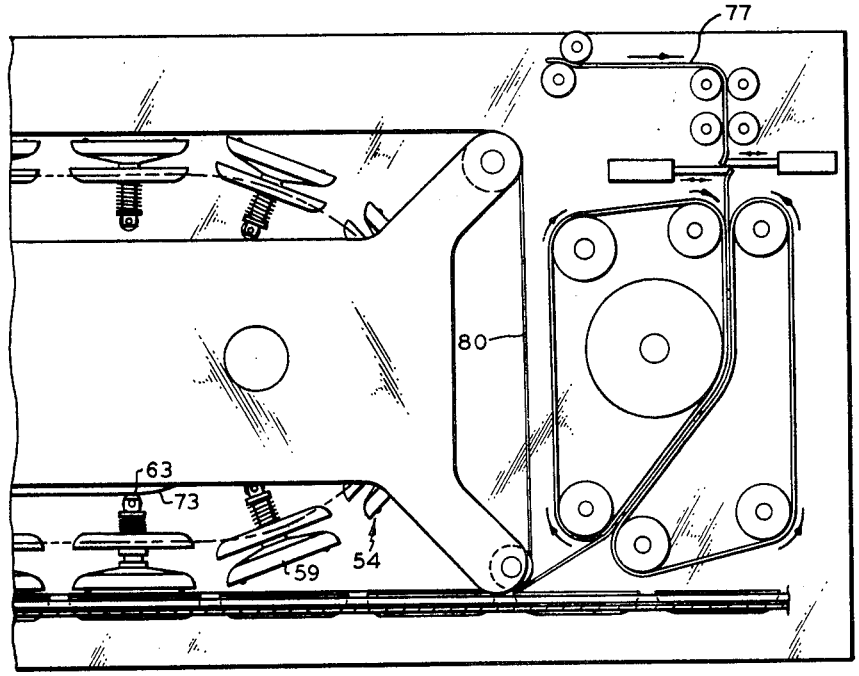
Figure 5:
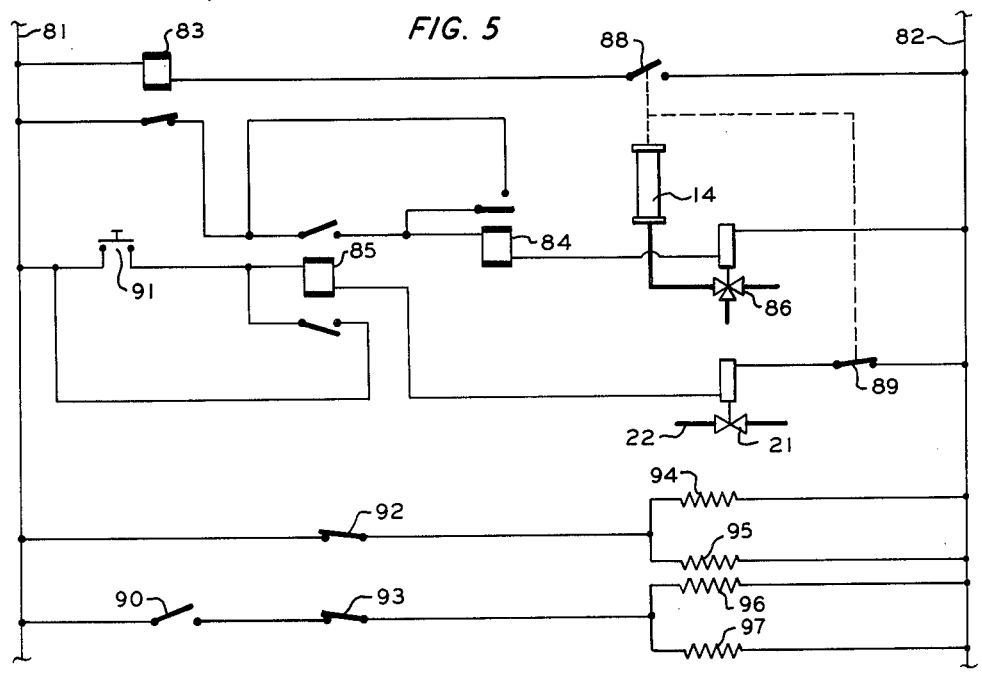
Figure 3:
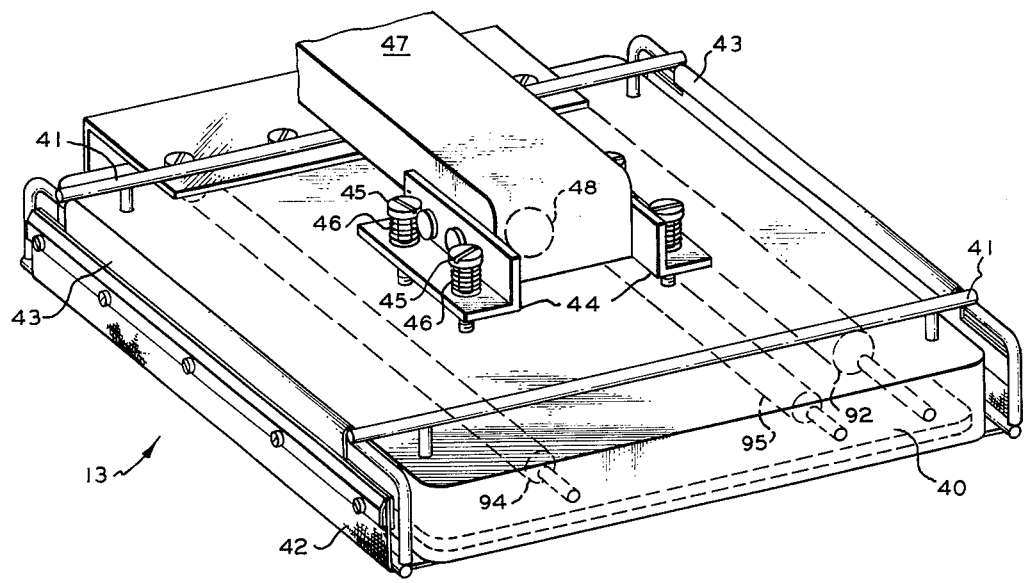

In the drawing:
FIGURE 1 is an elevation of a machine having a single heat sealing element.
FIGURE 2 illustrates a machine designed for continuous operation, having a plurality of sealing elements.
FIGURE 3 is a sealing element suitable for use with the machines of FIGURE 1 and FIGURE 2.
FIGURE 4 illustrates a machine utilizing a continuous flexible belt interposed between the sealing elements and the thermoplastic units being sealed.
FIGURE 5 is a circuit diagram of a cycle control system for the apparatus of FIGURE 1.

According to my invention a flexible member is interposed between a heated sealing element and a thermoplastic unit to be sealed, and is normally spaced apart from both the sealing element and the thermoplastic unit, contact of the thermoplastic unit and the sealing element being made through the flexible member, accompanied by some bending of this member. The flexible member can be attached to the sealing element by means which position it across the face thereof and spaced a short distance away from the face or it can be in the form of a continuous belt which travels at substantially the same linear speed as the units to be sealed and the sealing elements, spaced between the two and apart from both.

Also, according to my invention a system is provided whereby a package is purged prior to the installation of a lid thereon and the purge nozzle is withdrawn by means acting conjointly with means to move the sealing element into sealing engagement. An automatic cycle of operation includes the withdrawal of the purge nozzle, the sealing engagement of the sealing element, withdrawal of the sealing unit from sealing engagement and preparation for another cycle.

Further, according to my invention there is provided an improved heat sealing element which comprises a heated sealing surface and a flexible member extending over and spaced from this surface.

A machine for sealing individual packages is illustrated in FIGURE 1 and comprises base 10, frame 11, package receptacle 12, pivoted sealing element 13, and air cylinder 14. Sealing head 13 is attached to package receptacle 12 by a pivotal connection 15 and to air cylinder 14 by pivotal connection 16. Air cylinder 14 in turn is attached to base 10 by pivotal connection 17. Purge nozzle 18 is attached to frame 11 by pivotal connection 19 and is connected by flexible conduit 20 to steam valve 21. A flexible connection 24 connects sealing head 13 with purge nozzle 18 to cause nozzle 18 to be withdrawn just prior to the time head 13 makes sealing engagement with the thermoplastic package. Connector 24 comprises a wire 25 and a conduit 26. Connector 24 is positioned by attaching conduit 26 to the stationary portion of the machine at brackets 27 and 28. Wire 25 is actuated by an arm 32 attached to shaft 33 which moves with head 13. As head 13 approaches package receptacle 12, arm 32 engages flange 30 thus extending wire 25 causing it to pull against flange 29, tilting nozzle 18 and withdrawing it from package receptacle 12 just prior to the time when sealing head 13 makes sealing engagement therewith. As head 13 returns to the inoperative position illustrated in the drawing, arm 32 returns to the position shown but nozzle 18 remains tilted. This permits easy removal of the sealed package and insertion of the next package to be sealed after which nozzle 18 is manually returned to the position shown in the drawing, flange 31 serving as a stop to prevent excessive movement. A suitable handle such as handle 18a is attached to nozzle 18 to facilitate movement thereof.

As cylinder 14 extends to actuate sealing head 13 it will be seen that, as sealing head 13 pivots about connection 15, the upper end of the air cylinder housing at connection 16 is moved outward and to the right, in the view of FIGURE 1, as well as upward. This motion is utilized to actuate a switch 34 which is provided with two separate sets of contacts, one normally open and the other normally closed. To facilitate removal of the sealed package from receptacle 12 a lifter is provided in the lower portion of the receptacle and is adapted to be raised by a handle 36 attached thereto. Guide pins 37 are provided to locate package lids in position for proper registration before the sealing head is engaged.

Sealing head 13 is illustrated in more detail in FIGURE 3 and comprises sealing plate 40 into which are placed suitable electrical heating elements and a thermoswitch for temperature control, a belt frame 41 and a flexible belt 42 attached by a pair of mounting clips 43. In this manner the belt 42 is arranged over the heated face of sealing plate 40, parallel thereto and spaced therefrom. Thus, when head 13 is moved into sealing engagement with the lid of a package to be sealed, belt 42 contacts the surface to be sealed first and is then deformed by further movement of the sealing head until the face of sealing plate 40 moves into sealing engagement at which time plate 40 contacts one side of belt 42, the other side of which is pressed against the unit to be sealed and heat is transferred through belt 40 to effect the seal.

Head 13 is held in place by a pair of brackets 44 which are attached to the head by several screws 45, loosely fitted in the brackets, and confining springs 46. A spherical indentation is provided in the upper surface of head 13 and in support arm 47, and a ball 48 is confined therebetween to position head 13 laterally but permit some tilting to compensate for slight unevenness in the package or lid being sealed.

In the operation of the sealer illustrated in FIGURES 1 and 3 a thermoplastic package is placed in receptacle 12 either empty or partially or fully filled. The means for filling the container can be any suitable means, such as, for example, a filling nozzle above receptacle 12, out of the zone of travel of sealing heat 13. After the filling is completed nozzle 18 is pushed manually into position as illustrated in FIGURE 1, overlaying the package and a lid is placed between guide pins 37, on top of nozzle 18 over the package in package receptacle 12, and push button 38 is pressed to start the operation of the machine. A suitable film roller (not shown) may be provided at one side of the upper portion of the machine and used for the lid material. In this instance the end guide pins 37 are removed. The packages may be cut apart as sealed or may remain attached together by the sealing material for further handling. Solenoid valve 21 is actuated to direct steam to nozzle 18 to purge the container to be sealed. At the same time air cylinder 14 is actuated to start the movement of sealing head 13 toward the position of sealing engagement. Just prior to the time head 13 reaches sealing engagement, arm 32 engages flange 30 whereby further movement of sealing head 13 causes arm 32 to tilt flange 30 thus extending wire 25, exerting a force on flange 29 to tilt purge nozzle 18 away from the area overlying receptacle 12, thus permitting head 13 to move into sealing engagement. Just prior to the engagement of arm 32 with flange 30, switch 24 is actuated by movement of the upper portion of the housing of air cylinder 14. This actuates a pair of normally closed contacts to open a circuit thus deactivating valve 21 to discontinue the flow of purge vapor or gas. For example steam and nitrogen have been utilized for this purpose. A pair of normally open contacts are closed to actuate a timing cycle as further described below in connection with FIGURE 5, thus permitting sealing head 13 to remain in sealing engagement for the desired amount of time following which air cylinder 14 is operated to withdraw head 13 to its inactive position as illustrated in FIGURE 1.

A machine for continuous automatic operation is illustrated in FIGURE 2, and comprises pairs of sprockets 50 and 51 and driving chains 52 and 53. A plurality of sealing units 54 are attached between chains 52 and 53 with pivotal connections engaging pins 57 and sliding connections engaging pins 58.

Sealing units 54 further comprise a movable sealing element 59 which is provided with an electrical heating element (not shown), a brush assembly 61 held in place by clamps 62, a cam follower roller 63, a shoulder 64 and guide pins 75. Guide pins 75 are not essential in all instances. A spring 66 is compressed between shoulders 64 and 67, to urge movable sealing element 59 to its retracted position. A belt 68 is attached to sealing unit 54 and extends over the sealing face of the movable sealing element 59 spaced from the sealing face as shown. The machine further comprises bus bars 71 and 72 and an elongated cam 73. A conveying section 74, provided with suitable chain drive and package receptacles as shown, is synchronized with the upper portion of the machine to permit each package to travel parallel with and synchronized with a corresponding sealing element through the sealing zone. Guide pins 75 engage corresponding guiding holes 76 to counteract the slight amount of lost motion in the mechanism and perfectly align each sealing unit 54 with a corresponding package.

In operation thermoplastic packages filled with a predetermined amount of a commodity to be packaged proceed along conveying section 74 and a film is fed over the top of the packages. As each package travels under the upper portion of the machine the corresponding sealing unit 54 is positioned directly over the moving package. As the units proceed further, a roller 63 of movable sealing element 59 engages elongated cam 73 to move element 59 downward into engagement with the cover of the corresponding package. Guide pins 75 engage holes 76 for perfect alignment and the base of element 59 presses, through belt 68 against the package cover, thus providing the heat necessary to effect the desired seal. Cam 73 maintains element 59 in contact with the package assembly for a period of time sufficient to obtain a satisfactory seal with the particular film thickness, sealing temperature and speed of travel.

Brush assemblies 61, through contact with bus bars 71 and 72 provide electrical power from a suitable source of electrical energy, not shown, to the heating elements of sealing elements 59. After the desired contact time, determined by the length of cam 73, sealing element 59 is retracted by spring 66, acting against shoulders 64 and 67. The sealing unit 54 proceeds on around the upper portion of the machine while the now sealed package travels on toward the end of conveying section 74 where it is transferred to a suitable package removal conveyor not shown. Film 77 can be cut into individual cover pieces prior to, coincident with, or following the sealing operation, through the use of suitable cutting elements, for example, hot wire cutters, not shown.

In FIGURE 4 there is illustrated a machine for continuous operation which comprises a single endless belt rather than a plurality of individual belts fixed on the individual sealing units. In this figure details of the sealing elements, actuating cams, bus bars, brushes, etc., are not shown since these are all substantially the same as those illustrated in the machine of FIGURE 2. However, in this embodiment sealing elements 59 do not have the belts 68. Rather, an endless belt 80 is positioned mid-way between the normal, retracted, position of elements 59 and the tops of the packages to be sealed. When the cam 73 engages a cam follower roller 63 of one of the sealing units 54 the corresponding sealing element 59 is pressed downward thus engaging belt 80 and depressing a portion of belt 80 until it contacts the corresponding package below. Similarly, when the end of cam 73 is reached the element 59 lifts upward thus permitting belt 80 to return to its normal position, spaced from the top of the packages after which element 59 retracts further and the belt 80 is then spaced both from the sealed package and the sealing element. It will be seen that a certain amount of flexing and bending of belt 80 is involved in the engaging and disengaging steps.

Temperature control of the continuous operation machine is obtained by a brush-type sensing element 98 which contacts the sealing units serially and regulates the heat input to these units.

In FIGURE 5 is illustrated a suitable control system for the machine of FIGURE 1. This system comprises a pair of wires 81 and 82 connected across a suitable source of electrical energy, not shown, relays 83, 84 and 85, solenoid valves 86 and 21, mechanical switches 88, 89 and 90, push button switch 91, thermoswitches 92 and 93, heating elements 94, 95, 96 and 97 and air cylinder 14. When push button 91 is depressed, this completes a circuit through the coil of relay 85, the coil of solenoid valve 21 and normally closed switch 89. Relay 85 closes its normally open contacts completing a circuit around push button 91 thus locking relay 85 and valve 21 in and completing a circuit through the normally closed contacts of relay 83 through the coil of relay 84 and the coil of solenoid valve 86. The normally open contacts of relay 84 close to lock in this circuit around the normally open contact of relay 85. In this manner valve 21 is opened to start the steam purge and valve 86 is moved to the position which permits air under pressure to flow into the lower portion of air cylinder 14 thus extending the cylinder. As cylinder 14 is extended sealing unit 13 is moved toward its position of sealing engagement. Prior to reaching this position, however, switch 34 is engaged thus opening contacts 89 and closing contacts 88. When contacts 89 are opened the circuit through relay 85 and the coil of valve 21 is opened thus discontinuing the flow of purge steam and permitting relay 85 to return to the inactive position with its contacts open. However, at this time, relay 84 is maintaining the circuit through solenoid valve 86 so that the air cylinder continues to move toward its fully extended position. When the normally open switch 88 is closed this energizes relay 83. Relay 83 is a time delay relay, preferably one having an adjustable delay. The delay of this relay is adjusted so that it opens its normally closed contacts only after sealing head 13 has been in sealing engagement position for a desired length of time. When this occurs the contacts of this relay open, opening the circuit through relay 84 and the coil of valve 86, permitting these to return to their inactive position whereby the contacts of relay 84 are opened and valve 86 is in a position whereby the flow of air and the pressure to cylinder 14 is discontinued and the space beneath cylinder 14 is opened to the atmosphere. A spring (not shown) within air cylinder 14 returns the cylinder to its normal, retracted, position and returns sealing head 13 to the position in FIGURE 1. So that the adjustable delay of relay 83 is the controlling factor which accurately regulates the sealing time, it is usually desirable to have the contacts 88 of switch 34 close just prior to engagement of the sealing face with the package lid and thus these contacts normally are designed to be closed somewhat later than the contacts 89 which cause the flow of steam to be discontinued prior to withdrawal of the purge nozzle 18 from the purge position illustrated, preventing uncontrolled flow of steam as this nozzle is withdrawn. The heating elements 94 and 95 are those within sealing plate 40 and the flow of current through these elements is controlled by thermo-switch 92 also positioned in sealing plate 40. Heating elements 96 and 97 are within package receptacle 12 and are controlled by a thermo-switch 93 but can be deactivated through the use of manual switch 90. Other combinations can be used to provide the desired control, as for example, the use of a four-way valve in place of three-way valve 86 in which case an air cylinder having air actuation in two directions can be used. In this event it would not be necessary to provide the relay 84 since a momentary actuation of the four-way valve would place it in position to cause cylinder 14 to be moved to its fully extended position. On the other hand relay 83 then could be used to activate a circuit to move valve 86 to its opposite position rather than opening the circuit to permit the valve to return its normal position as illustrated in this figure. Alternatively a pair of three-way valves can be used to obtain two-way operation of the cylinder 14, one valve operating through the circuit which includes the contact of relay 85 and the other valve being actuated by relay 83. A suitable rotary timer can be used in place of relay 83.

In each of the embodiments illustrated it will be seen that a suitable flexible member is interposed between the heated sealing face of the sealing member and the thermoplastic unit which is to be sealed, the flexible member being normally spaced apart from both the sealing member and the thermoplastic unit and incurring some deformation, flexing and bending, during the interval of obtaining sealing engagement and the interval of disengagement. This feature I have found is very advantageous in preventing adherence of the sealing element and the unit to be sealed, and being successful in preventing such adherence even though the separation occurs while the seal is still heated, no precooling being required either to remove the sealing element or the flexible member from engagement with the sealed unit when my invention is utilized. I have found a particularly desirable material for use as the flexible member, either in the form wherein it is attached to an individual sealing unit or in those instances in which it takes the form of an endless belt, to be a polytetrafluoroethylene impregnated glass fiber cloth. Other examples of suitable materials for use as the flexible member are polyethylene terephthalate and polytrifluorochloroethylene either as a homogeneous material or impregnated on fiberglass or other suitable heat resistant cloth.

Reasonable variations and modifications are possible within the scope of the foregoing disclosure, the drawing and the appended claims in which are set forth method and apparatus for heat sealing thermoplastic packages utilizing a flexible member interposed between a heated sealing element and a thermoplastic unit, the flexible member being spaced from both the sealing element and the thermoplastic unit and incurring some flexing and bending as the two are moved into and out of sealing engagement.

I claim:
1. A method for heat sealing a thermoplastic unit, comprising:
   maintaining a heat source at substantially constant temperature;
   moving said heat source and a flexible member, tightly stretched a short distance from the face of said source parallel therewith and extending beyond the periphery of said unit, toward and into contact with said thermoplastic unit;
   deforming said flexible member by the relative motion of said source and said unit, sufficiently to press said source tightly against said unit, with said member interposed between, while permitting no movement of said member toward said source without accompanying deformation, said member while said source is pressed against said unit extending beyond the periphery of said unit;
   maintaining said source and said unit pressed together for a sufficient time to effect the desired seal by transfer of heat from said source through said member; and
   moving said source away from and out of contact with said unit, the relative movement of said source and said unit as they are moved apart moving the edges of said member before moving the center of said member, thereby permitting said flexible member to return to its original position, positioned a short distance from the face of said source and out of contact with said unit.

2. The method of claim 1 wherein said flexible member comprises a polytetrafluoroethylene impregnated glass fiber cloth.

3. A method for heat sealing a thermoplastic unit comprising:
   maintaining a heat source at substantially constant temperature;
   moving said heat source and a flexible member, tightly stretched a short distance from the face of said source, parallel therewith and extending beyond the periphery of said unit, toward and into contact with said thermoplastic unit;
   deforming said flexible member by the relative motion of said source and said unit sufficiently to press said source tightly against said unit, with said member interposed between, while permitting no movement of said member toward said source without accompanying deformation, said member, while said source is pressed against said unit extending beyond the periphery of said unit, a portion of said member moving beyond the plane of that portion of said unit which is pressed against said source; and moving said source away from and out of contact with said unit, the relative movement of said source and said unit as they are moved apart moving the edges of said portion of said member before moving the center of said member, thereby permitting said flexible member to return to its original position parallel and tightly stretched a short distance from the face of said source and out of contact with said unit.

4. Means for sealing a thermoplastic unit, comprising:
means to locate said unit in sealing position;
a movable sealing head comprising
    a heat sealing plate comprising a heat sealing surface,
    a frame fixedly attached to said plate and substantially immovable with respect to said plate to change the distance therebetween, and
    a flexible member positioned by said frame, tightly stretched a short distance from said sealing surface parallel therewith and in sealing position extending beyond the periphery of said unit being sealed;
means to heat said sealing plate and to maintain the temperature of said plate substantially constant; and
means to move said sealing head toward and into contact with said unit, thereby deforming said member sufficiently to press said sealing surface tightly against said unit, with said member interposed therebetween, to seal said unit, and to move said sealing head away from and out of contact with said unit, thereby permitting said member to return to its original position with respect to said plate.

5. The apparatus of claim 4 wherein said flexible member comprises polytetrafluoroethylene impregnated glass fiber cloth.

6. Means for sealing a thermoplastic unit comprising:
means to locate said unit in sealing position;
a movable sealing head comprising
    a sealing plate,
    a frame fixedly attached to said plate and substantially immovable with respect to said plate to change the distance therebetween, said frame comprising first and second frame members positioned with respect to said plate to support and position said flexible member tightly stretched a short distance from the face of said plate, parallel therewith, and in sealing position, extending beyond the edge of said unit being sealed;
means to heat said sealing plate and to maintain the temperature of said plate substantially constant; and
means to move said sealing head toward and into contact with said unit, thereby deforming said flexible member sufficiently to press said plate tightly against said unit, with said flexible member interposed between, to seal said unit, and to move said sealing head away from and out of contact with said unit, thereby permitting said flexible member to return to its original position with respect to said plate.

7. The machine of claim 6 wherein said flexible member comprises polytetrafluoroethylene impreganted glass fiber cloth.

8. A package sealing machine comprising:
means to convey packages to be sealed along a predetermined path;
means to convey movable sealing heads for said packages parallel with and synchronized with said packages, each sealing head comprising:
    a heat sealing plate having a sealing surface,
    a frame fixedly attached to said plate and substantially immovable with respect to said plate to change the distance therebetween, and
    a flexible member positioned by said frame, tightly stretched a short distance from said sealing surface, parallel therewith and in sealing position, extending beyond the periphery of said unit being sealed;
means to heat said sealing plate and to maintain the temperature of said plate substantially constant; and
means to move said sealing heads into contact with said packages along said predetermined path.

9. A sealing head comprising:
a heat sealing plate,
a flexible member,
a frame supporting and positioning said member across the face of said source, spaced a short distance therefrom, and
support means for said frame, said support means comprising a solid support member rigidly attached to said plate and to said frame whereby said frame is substantially immovable with respect to said plate to change the distance therebetween; and
means to heat said sealing plate and to maintain the temperature of said plate substantially constant.

10. The heat sealing element of claim 9 wherein said flexible member comprises polytetrafluoroethylene impregnated glass fiber cloth.

11. The heat sealing element of claim 6 wherein said flexible member comprises the polyethylene terephthalate.

12. The heat sealing element of claim 6 wherein said flexible member comprises the polytrifluorochloroethylene.

13. The method of claim 1 wherein said flexible member comprises polyethylene terephthalate.

14. The method of claim 1 wherein said flexible member comprises polytrifluorochloroethylene.

15. A package sealing machine, comprising:
means to convey packages to be sealed along a predetermined path;
means to convey movable sealing heads for said packages parallel and synchronized with said packages, each of said sealing heads comprising a heat sealing plate;
means to heat said plate and to maintain the temperature of said plate substantially constant;
a flexible belt interposed between and spaced apart from said sealing elements and said packages;
resilient means to apply force to urge said sealing plates out of contact with said packages; and
means to overcome said resilient means to force said sealing plates into sealing engagements, thereby deforming said belt sufficiently to press said plate tightly against said package with said belt interposed therebetween, sealing said packages.

References Cited by the Examiner

UNITED STATES PATENTS

| | | | |
|---|---|---|---|
| 2,392,695 | 1/46 | Rohdin. | |
| 2,609,316 | 9/52 | Fichtner | 53—379 X |
| 2,638,964 | 5/53 | Andina. | |
| 2,707,018 | 4/55 | Bolton. | |
| 2,727,345 | 12/55 | Schoppee | 53—388 |
| 2,738,828 | 3/56 | Hammer. | |
| 2,877,121 | 3/59 | Anderson et al. | 53—180 X |
| 2,888,792 | 6/59 | James | 53—79 |
| 2,904,943 | 9/59 | Dreyfus et al. | 53—39 X |
| 2,916,864 | 12/59 | Meissner | 53—180 |
| 2,961,031 | 11/60 | Fener. | |
| 3,001,348 | 9/61 | Rado | 53—373 X |
| 3,018,594 | 1/62 | Phillips | 53—373 X |

FRANK E. BAILEY, *Primary Examiner.*

ROBERT A. LEIGHEY, *Examiner.*